United States Patent

[11] 3,569,966

[72] Inventors William J. Dunn
Margate City;
Edward M. Sawtelle, Ventnor, N.J.
[21] Appl. No. 829,998
[22] Filed June 3, 1969
[45] Patented Mar. 9, 1971
[73] Assignee The United States of America as represented by the Secretary of the Army and/or the Administrator of the Federal Aviation Administration

[54] TIME COMPRESSION OF RADAR VIDEO
11 Claims, 5 Drawing Figs.
[52] U.S. Cl. .................................................. 343/13, 343/5, 343/6
[51] Int. Cl. .................................................. G01s 9/04
[50] Field of Search ....................................... 315/10; 343/5 (EI), 5 (DP), 6, 6 (TV), 13

[56] References Cited
UNITED STATES PATENTS
| | | | |
|---|---|---|---|
| 3,188,386 | 6/1965 | Byatt | 343/6(TV)X |
| 3,191,169 | 6/1965 | Shulman et al. | 343/5(EI) |
| 3,211,898 | 10/1965 | Fomenko | 343/13X |

Primary Examiner—Rodney D. Bennett, Jr.
Assistant Examiner—Malcolm F. Hubler
Attorneys—Alva H. Bandy, William G. Gapcynski and Lawrence A. Neureither ABSTRACT: A system for achieving radar video sweep time reduction in order to provide more time to write alphanumerics on a radar PPI display. The system utilizes analogue or digital techniques for the time compression which is accomplished by storing the radar video and subsequently reading out the stored information for display. When less time is utilized for reading out the information than the time required to store the information, time compression of the radar video occurs.

PATENTED MAR 9 1971  3,569,966

INVENTORS
WILLIAM J. DUNN &
EDWARD M. SAWTELLE

BY *Alva H. Bandy*

ATTORNEY

TIME COMPRESSION OF RADAR VIDEO

The invention described herein may be manufactured and used by or for the Government for governmental purposes without the payment to us of any royalty thereon.

BACKGROUND OF THE INVENTION

Presently, alphanumerics are used to identify broadband radar targets on a PPI display for air traffic controllers and are written during the time available between the end of a range sweep and the beginning of the next range sweep, i.e., the dead time. The sweep time increases as the range increases with resulting decrease in available dead time. In addition, a greater number of targets become available for identification requiring the alphanumerics to be written at a faster rate which taxes the ability of present alphanumeric generators. With present systems, the writing of real time radar video occupies at maximum range approximately 90 percent of available time with 10 percent dead time available for writing alphanumerics. This small percentage is, of course, inadequate to write all of the alphanumerics needed or desired.

SUMMARY OF THE INVENTION

The present invention provides radar video sweep time reduction by storing the incoming video and then reading out the information from storage for display in less time than that required to store the information originally thereby reducing the time required to a constant time independent of radar display range. The storage and read out may be accomplished by either analog or digital techniques.

Accordingly, it is an object of the present invention to provide a system of time compression of radar video to permit greater time for writing alphanumerics on a PPI display.

It is another object of the present invention to provide for radar video sweep time reduction by utilizing an analog system.

It is a further object to provide a digital system for the time compression of radar video.

It is yet another object of the present invention to provide a radar video time compression system having a substantially imperceptible delay such that the compressed radar video is displayed in approximately real time.

Other objects and many of the attendant advantages of this invention will become more fully apparent from the following detailed description when considered in connection with the accompanying drawings.

DESCRIPTION OF THE PREFERRED EMBODIMENTS

Figure 1:
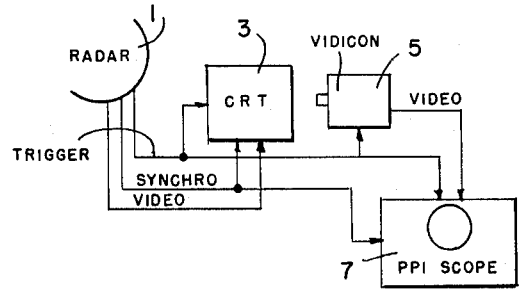
FIG. 1 is a block diagram arrangement of an analog system of radar video sweep time reduction according to the present invention.
Figure 2:
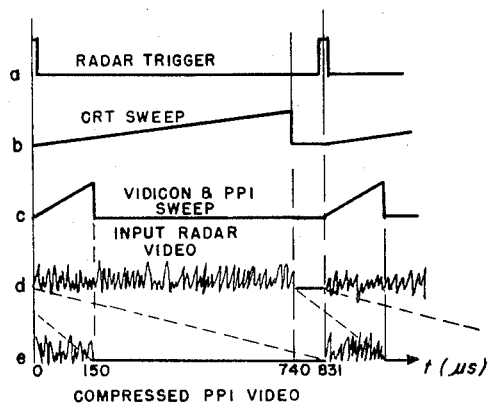
FIG. 2 is a graph of the time relations for the cathode ray tube-vidicon system of FIG. 1.

Referring now to the drawings, there is shown in FIG. 1 the analog system of the present invention in combination with a conventional radar system. The radar system is represented by an antenna which provides synchro, trigger pulse and video inputs to a cathode ray tube 3 for display. For purposes of explanation, the radar display system is assumed to have a maximum display range of 60 nautical miles, a minimum display range of 6 nautical miles, a pulse repetition rate of 1,200 p.p.s., a video amplifier bandwidth of 2.5 MHz. and a target pulse duration of 2.0 $\mu$sec. FIG. 2 is a graphic representation of the timing relationships for the assumed radar system with trace, a, of FIG. 2 showing that the radar trigger pulses occur at approximately 831 $\mu$sec. intervals and trace, b, of FIG. 2 showing that the time required to write 60 miles of radar video on the cathode ray tube 3, i.e., sweep time, is approximately 740 $\mu$sec. Thus, for such a system, the dead time available between the end of a range sweep and the next range sweep at the 60-mile range is only 91 $\mu$sec. which is not sufficient time to write the required additional information on the display.

Figure 3:
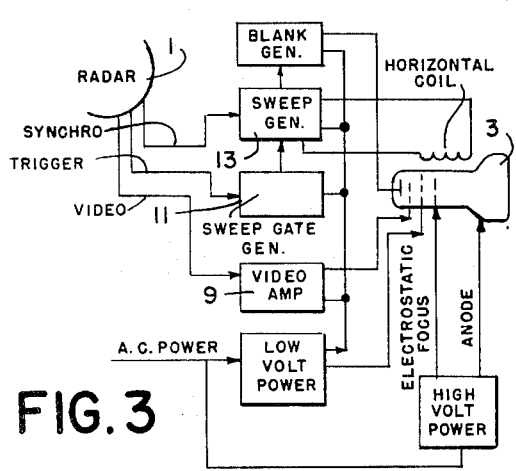
FIG. 3 is a block diagram arrangement for the input to the input PPI of the system of FIG. 1.
Figure 4:
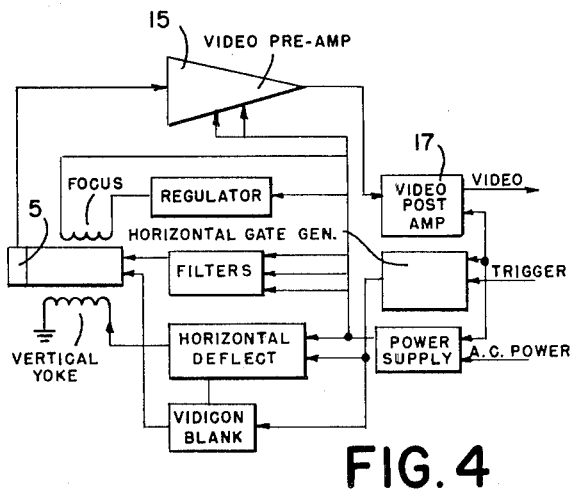
FIG. 4 is a block diagram arrangement for the vidicon readout of the system of FIG. 1.

In accordance with the present invention, the available dead time is increased by means of a vidicon camera 5 and a radar console display cathode ray tube 7 in conjunction with the conventional display system. As shown in FIG. 1, both the vidicon 5 and the cathode ray tube 7 receive the radar trigger pulses with the display scope 7 also receiving synchro information from the radar 1 and the video output from the vidicon. Conventional block diagram arrangements for the vidicon and display scope are shown in FIGS. 3 and 4, respectively. However, in view of the fact that the operation of these devices is well known, only that portion of the operation necessary for a clear understanding of the present invention will be discussed.

As shown in FIG. 3, radar video from the radar 1 is fed via a 2.5 mHz. bandwidth video amplifier 9 to the grid of the high resolution cathode ray tube 3. The radar trigger and synchro information is supplied to a sweep gate generator 11 and a sweep generator 13, respectively, for causing beam deflection along a single axis in a line across the diameter of the scope 3. Although horizontal and vertical axis deflection could be utilized, single axis deflection was chosen for simplicity in read out. Thus, as shown in traces, b, and, d, of FIG. 2, the deflection sweep voltage for cathode ray tube 3 is initiated with the radar trigger at time zero and continues to a range of 60 miles or approximately 740 $\mu$sec. In accordance with the features of the present invention, the vidicon camera 5 optically records the output of scope 3 such that as the phosphor of scope 3 is activated, the image of the phosphor is stored on the vidicon 5 until read out.

As shown in trace, c, of FIG. 2, readout of the vidicon is accomplished in approximately 150 $\mu$ with the readout initiated at range time zero. It should be noted that the readout start time is largely independent of the input radar timing with start at time zero being selected for purposes of convenience. Referring again to the drawings, as shown in FIG. 4, the readout video signal is passed via the vidicon preamplifier 15 and the final output video amplifier 17 of approximately mHz. mHz. bandwidth to the grid of the radar PPI scope 7 where it is displayed in 150 $\mu$sec. as shown in trace, e, of FIG. 2. It should be noted that a feature of the readout with the present system is that there is provided a sweep to sweep integration effect which improves the signal to noise ratio of the output video signal. The integration effect is achieved in that the initial read out of the vidicon wipes the stored image down to approximately 50 percent of its initial value. In accordance with the timing relationships of FIG. 2, a new sweep is written on the scope 3 and stored on the vidicon 5 and combined with the remaining image in the vidicon such that on the next readout of the vidicon, the combined image is read out with the previously stored image being reduced to approximately the noise level of the vidicon. Thus, a sweep to sweep integration is achieved on the successive sweeps with a resulting improvement in the signal to noise ratio.

Accordingly, as shown in FIG. 2, the analog system of the present invention provides for sweep time reduction in a constant delay time of one radar trigger with 60 miles of radar video being displayed in 150 $\mu$sec. rather than 740 $\mu$sec. resulting in a sweep reduction ratio of 5:1. Thus, with the present system, the radar console display has 831 $\mu$sec. − 150 $\mu$sec. or 681 $\mu$sec. available to the display for writing alphanumerics or other information rather than 91 $\mu$sec. as in the present state of the art systems. In addition, since the time compression occurred with only a delay of one radar trigger, i.e., 831 $\mu$sec., the radar video is displayed for the aircraft controller in substantially real time since the delay would be imperceptible to him.

Figure 5:
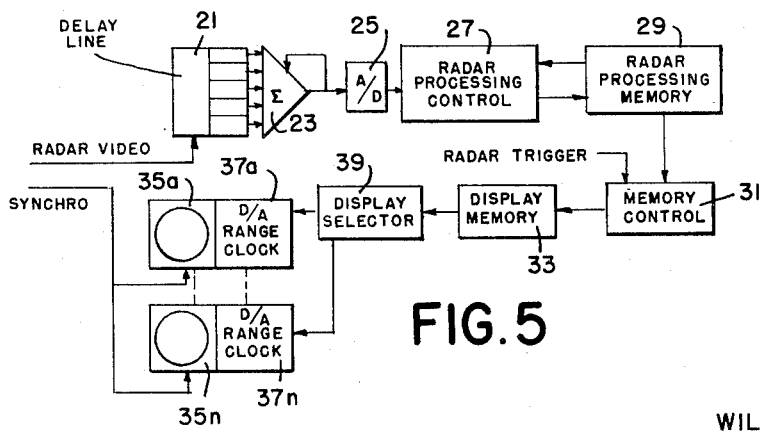
FIG. 5 is a block diagram arrangement of a digital radar sweep time reduction system in accordance with the present invention.

Referring again to the drawings, FIG. 5 is a block diagram arrangement of the radar sweep time reduction system utilizing digital techniques and, as shown, accepts radar video in analog form from the radar 1 for sampling and further processing. The sampling rate, if high enough to reproduce the initial wave shape must be at least twice the highest video frequency to be reproduced. In view of the fact that the radar target signals of the system are normally of 1 μsec. or 2 μsec. duration, the presence of these targets will be detected or sampled if the rate is set at 2 mHz. This sampling frequency will not aid in the discrimination of signal to noise energy pulses. However, when several samples of 5 mHz. rate are integrated, the presence of a high energy signal such as a target results in a high integration output. The output level of the integration will therefore be weighted toward wider duration pulses and the shorter, high voltage noise spike will produce a significant output only when occurring at a high frequency.

As shown in FIG. 5, the radar video in analog form is fed to a delay line arrangement 21 having a plurality of spaced taps the outputs of which are fed to an operational amplifier 23 for summing the input signals for video integration and providing an average level output signal to analog to digital converter 25 for detecting the level of the signal and providing a digital code output signal, e.g., a three bit byte representative of the input signal and coded to one of eight levels in binary format.

The output of the converter 25 is fed to a control for radar processing unit 27 which provides in the present digital system an arrangement for achieving sweep to sweep signal integration equivalent to the sweep to sweep integration inherent for the analog system of the vidicon or storage tube storage after readout The radar processing unit also receives an output from a radar processing memory 29 of previously stored data corresponding to the incoming data from converter 25. The processing unit 27 includes means such as two registers for performing a digital shift-right one bit on the stored data to reduce it to 50 percent of its original level and adding the shifted data to the new data from converter 25 as is well known in the art to thereby achieve a sweep to sweep integration effect. The resultant data is then, as shown in FIG. 5, fed to the processing memory 29 for storage and for utilization on the next sweep.

During radar video dead time, the contents of the radar processing memory is transferred to a display memory 33 via a radar video gating unit 31 controlled by the radar trigger pulse and resulting in the updating of all information in the display memory. The display memory is then ready to service the displays and provides an output to the display units 35a—35n and the associated digital to analog converters and range clock units 37a—37n via the display selector 39.

Since the display time is a constant, the time compression in the digital system is achieved by the clock-out rate to each display which must be variable in accordance with range and desired compression ratio. Thus, each display 35a—35n has its associated range clock 37a—37n set to the correct clock rate for its range and the required video data is fed from the display memory 33 via the display selector 39 to the appropriate digital to analog converter 37a—37n for display on the associated display scope 35a—35n. As noted previously, the time period being fixed, the information rate has to change in order to provide the proper time spacing for the 60-mile range and with range change, an appropriate change in clock rate is required. For example, assuming a memory of 4,400 bits or 1,466 bytes of three bits each and a display time of 150 μsec., then the clock must display the 1,466 bytes in the 150 μsec. period for the 60-mile range or a clock requirement of 10 mHz. Similarly, the clock for display of the 6-mile range in 150 μsec. would be 1 mHz. It should be noted that the number of separate ranges that is to be supplied by one display memory is fixed by the choice of the sweep time. However, as many display memories as desired can be added in parallel to the radar processing memory for feeding other displays.

Thus, it can be seen that the present invention by reducing the time required to write broadband data to a constant time which is independent of the radar display range provides adequate time for the writing of radar target associated alphanumeric data wherein the data and radar video is displayed in substantially real time.

It will be understood that the above description of the present invention is susceptible to various modifications, changes and adaptations, and the same are intended to be comprehended within the meaning and range of equivalents of the appended claims.

We claim:

1. A radar video time compression system for use with a radar system providing radar video signals wherein the time to display the radar video signals increases with increasing range, comprising:
    a. means responsive to radar video signals for storing representations thereof; and
    b. means for reading out said stored representations from storage in a predetermined constant time period which is independent of the time required to store said representations, said predetermined constant time period being less than the period of time required to store said representations at maximum range of the radar system.

2. The system as defined in claim 1 and further comprising:
    a. a first cathode ray tube responsive to said radar video signals for displaying said signals;
    b. a vidicon camera for storing representations of said displayed signals and for reading out said representations from storage in said predetermined period at desired intervals; and
    c. a second cathode ray tube responsive to said representations read out from said storage for displaying said representations in the same time period as said predetermined time period.

3. The system as defined in claim 2 wherein said first cathode ray tube is arranged to display said radar video signals along a single axis thereof.

4. A system as defined in claim 1 wherein said storage means stores representations of radar signals at different ranges in different storage times and said readout means reads out said representations corresponding to different ranges from said storage in the same time period.

5. The system as defined in claim 1 wherein said means responsive to radar video signals provides digital representations thereof and said storage means is a digital memory.

6. The system as defined in claim 5 wherein said means responsive to radar video signals comprises:
    a. means for sampling and integrating radar video signals to provide an average level output signal; and
    b. means for converting said average level signal in analog form to a digital code representation thereof.

7. The system as defined in claim 6 and further comprising:
    a. a radar processing memory for storing said digital code representations; and
    b. means responsive to said digital code representations from said converter means at a predetermined portion of a sweep and at a predetermined range and to a corresponding digital code representation from said processing memory for combining said digital code representations to provide a sweep to sweep integration for updating said processing memory.

8. The system as defined in claim 7 wherein said digital code representations are in binary form and said combining means includes means responsive to said binary code from said memory for shifting said binary code one bit to the right and for combining said shifted binary code to said binary code from said converter means to form a resultant binary code which is fed to said processing memory for storage.

9. The system as defined in claim 7 and further comprising:
    a. a display memory; and
    b. means responsive to the radar trigger for transferring said stored digital code representations from said processing memory to said display memory.

10. The system as defined in claim 9 and further comprising display means coupled to said display memory, said display means including range clock means for reading out said digital code representations from said display memory in a predetermined time period and digital to analog converter means for converting said digital code representations into analog form for display.

11. The system as defined in claim 10 wherein said display means further includes a plurality of display scopes, each of said scopes having an associated digital to analog converter and a range clock for displaying radar video for a predetermined range and selector means coupled to said display memory and said display means for coupling the digital code representations for a selected range to the appropriate digital to analog converter and display scope for the selected range.